(12) United States Patent
Petrangeli et al.

(10) Patent No.: US 9,249,913 B2
(45) Date of Patent: Feb. 2, 2016

(54) HYDRAULIC CROSS CONNECTION PROVIDED WITH SECURITY QUICK FASTENERS, RELATED KIT OF ACCESSORIES, AND RELATED HYDRAULIC SYSTEM

(75) Inventors: Gabriele Petrangeli, Cittaducale (IT); Stefano Livoti, Cittaducale (IT)

(73) Assignee: SEKO S.P.A. (IT)

( * ) Notice: Subject to any disclaimer, the term of this patent is extended or adjusted under 35 U.S.C. 154(b) by 2 days.

(21) Appl. No.: 14/233,552

(22) PCT Filed: Jul. 19, 2012

(86) PCT No.: PCT/IB2012/053703
§ 371 (c)(1),
(2), (4) Date: Jan. 17, 2014

(87) PCT Pub. No.: WO2013/011488
PCT Pub. Date: Jan. 24, 2013

(65) Prior Publication Data
US 2014/0124689 A1  May 8, 2014

(30) Foreign Application Priority Data

Jul. 20, 2011  (IT) .............................. RM2011A0388

(51) Int. Cl.
*F16L 37/14*  (2006.01)
*F16L 37/12*  (2006.01)
(Continued)

(52) U.S. Cl.
CPC ............... *F16L 37/12* (2013.01); *B01F 3/0865* (2013.01); *B01F 5/04* (2013.01); *B01F 5/0426* (2013.01); *F16L 35/00* (2013.01); *F16L 37/144* (2013.01); *B01F 2003/0896* (2013.01); *F16L 2201/20* (2013.01)

(58) Field of Classification Search
CPC ........ B01F 3/08; B01F 3/0861; B01F 3/0865; F16L 37/144; F16L 35/00; F16L 2201/20
See application file for complete search history.

(56) References Cited

U.S. PATENT DOCUMENTS 3,560,027 A * 2/1971 Graham ..................... 285/130.1
4,244,608 A   1/1981 Stuemky
(Continued)

OTHER PUBLICATIONS

International Search Report mailed Nov. 7, 2012, for PCT/IB2012/053703.

*Primary Examiner* — Kevin Murphy
(74) *Attorney, Agent, or Firm* — Hershkovitz & Associates, PLLC; Abe Hershkovitz

(57) ABSTRACT

This invention relates to a hydraulic system comprising a hydraulic cross connection (90), housed in a housing case (99) to be mounted on a rear planar support (98), comprising inlet and outlet ducts (70, 71), at least one tubular element (105, 106) insertable in each one of said ducts (70, 71), and at least one quick coupling removable hook (91; 991), configured to be inserted in a seat (100) obtained on an outer wall of each one of said ducts (70, 71), the hydraulic system being characterized in that said at least one quick coupling removable hook (91; 991) is configured to be posteriorly inserted in the seat (100) and it comprises at least one rear arm (95; 995), and in that the housing case (99) is shaped so that a distance separating the seat (100) of each one of said ducts (70, 71) from the rear planar support (98) is such that said at least one removable hook (91; 991) is removable from the seat (100) and said at least one tubular element (105, 106) is extractable from the inlet or outlet duct (70, 71) to which the seat (100) belongs only when the housing case (99) is not mounted on the rear planar support (98). This invention further relates to the related kit of hydraulic accessories and to the related hydraulic system, as well as to a mixing apparatus comprising such hydraulic system.

17 Claims, 4 Drawing Sheets

Figure 4:
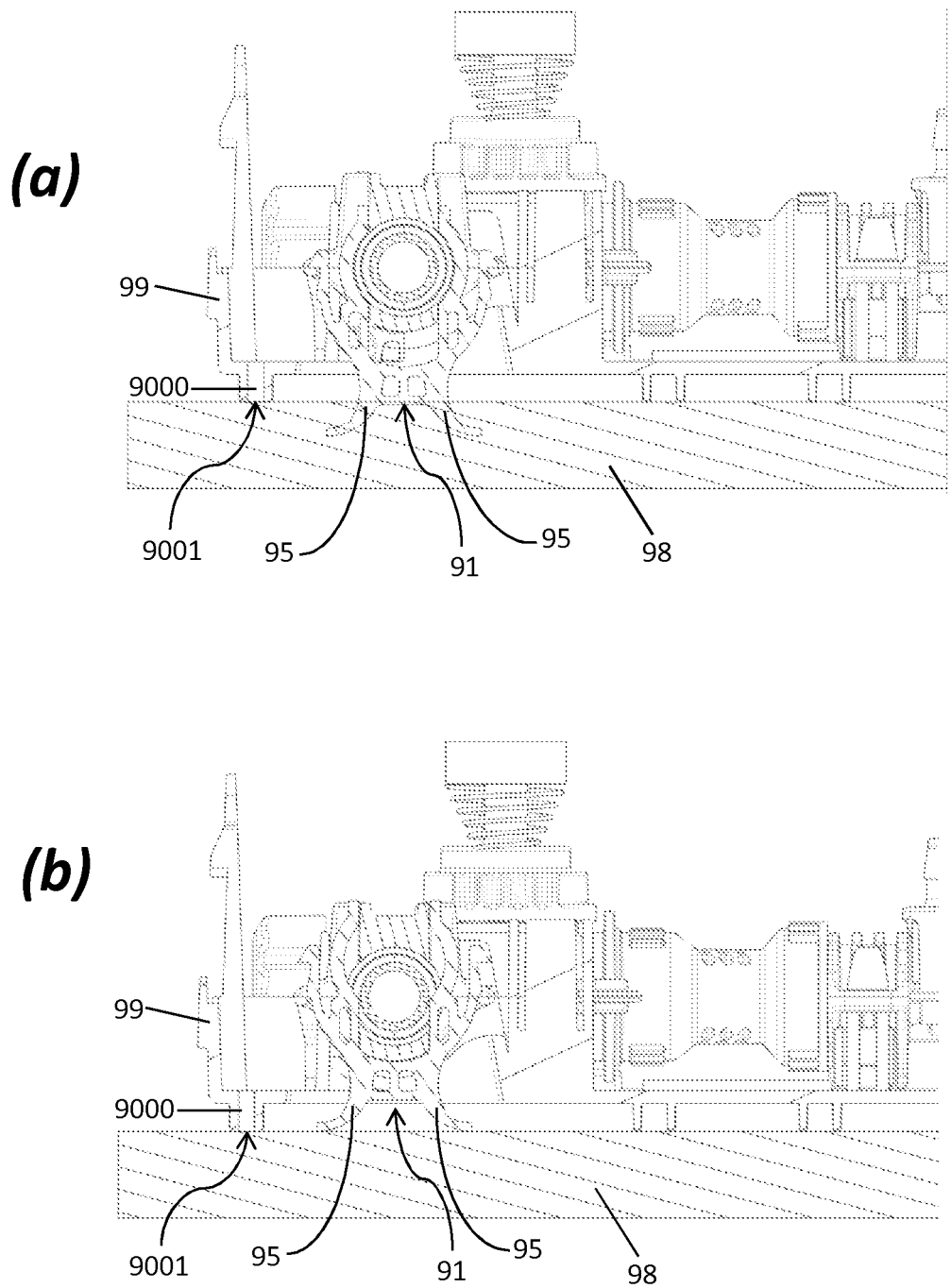

(51) Int. Cl.
*B01F 5/04* (2006.01)
*B01F 3/08* (2006.01)
*F16L 35/00* (2006.01)

(56) References Cited

U.S. PATENT DOCUMENTS

| | | | | |
|---|---|---|---|---|
| 4,453,747 | A | * | 6/1984 | Bimba ........................ 285/305 |
| 4,917,143 | A | * | 4/1990 | Grooms ....................... 137/343 |
| 5,271,646 | A | * | 12/1993 | Allread et al. ............. 285/124.2 |
| 7,017,621 | B2 | | 3/2006 | Beldham et al. |
| 7,780,200 | B2 | * | 8/2010 | Mitsui et al. ............... 285/124.1 |
| 2005/0200126 | A1 | * | 9/2005 | Fischer ........................ 285/305 |
| 2009/0160185 | A1 | | 6/2009 | Learmont et al. |
| 2014/0131601 | A1 | * | 5/2014 | Petrangeli et al. ....... 251/129.01 |
| 2014/0158241 | A1 | * | 6/2014 | Patreangeli et al. .......... 137/843 |
| 2014/0169121 | A1 | * | 6/2014 | Petrangeli et al. ......... 366/163.2 |

* cited by examiner

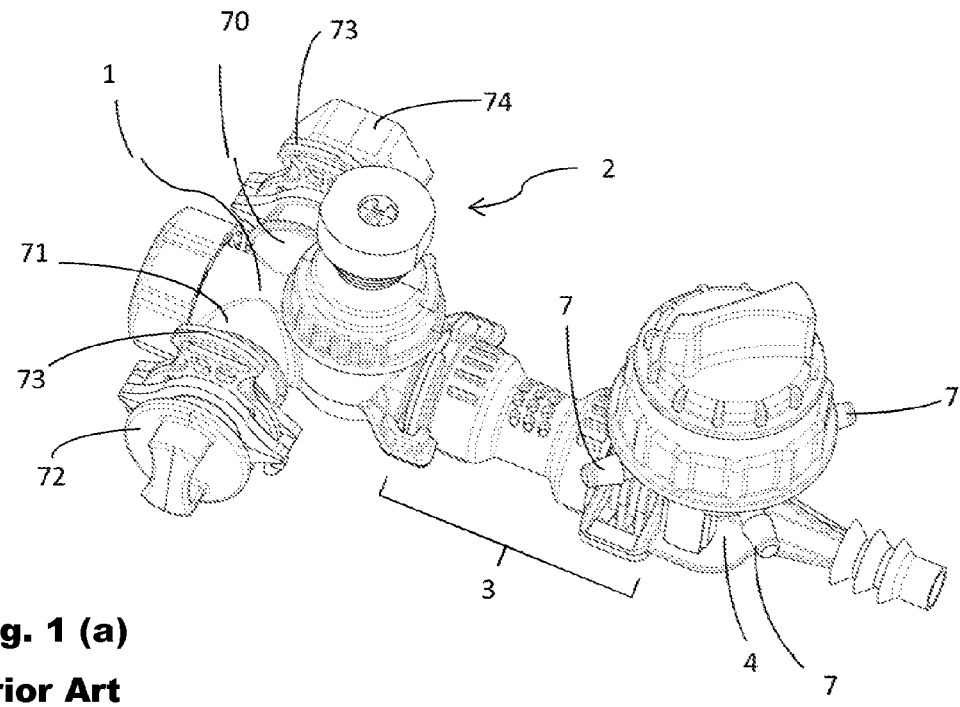
Fig. 1 (a)
Prior Art
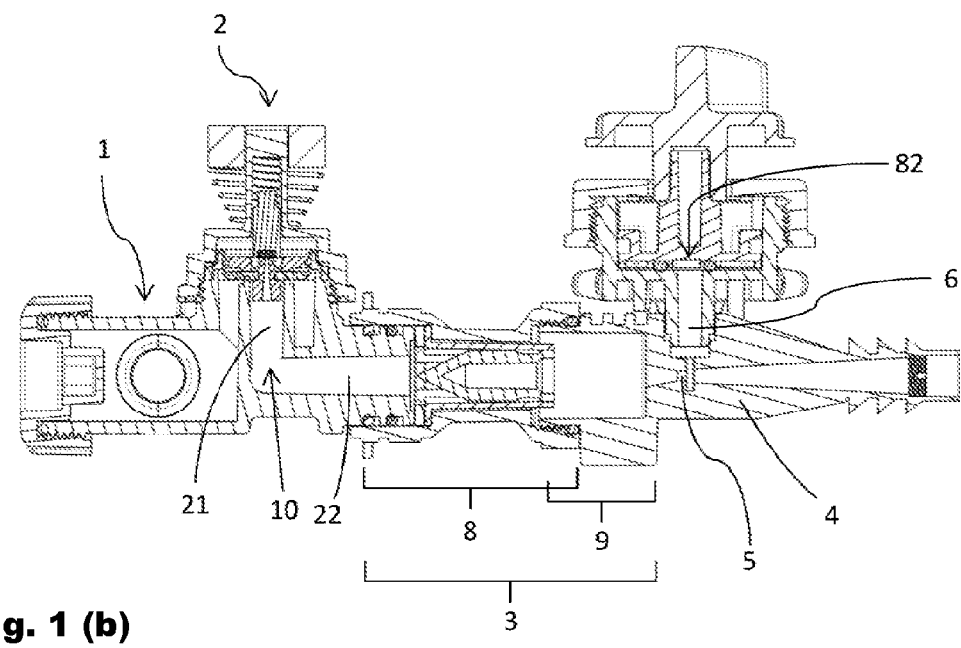
Fig. 1 (b)
Prior Art
Fig. 1

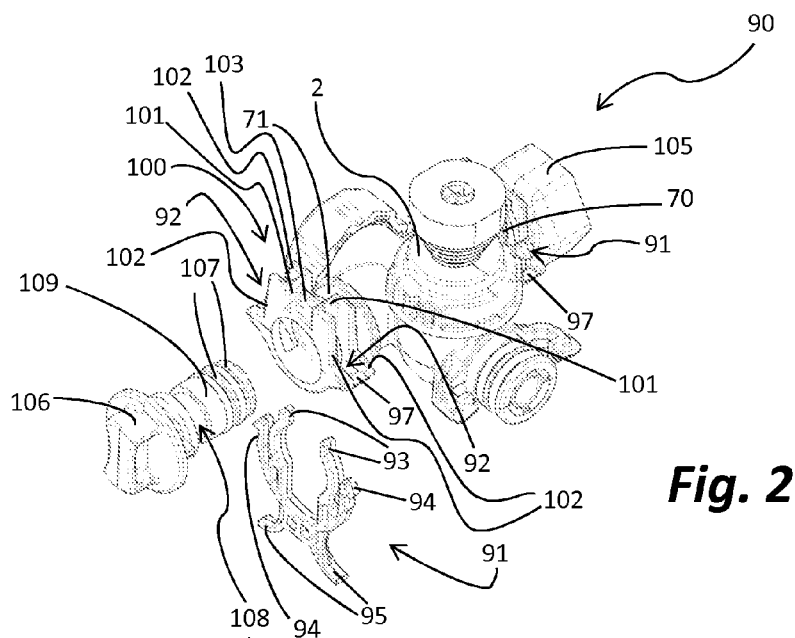
Fig. 2
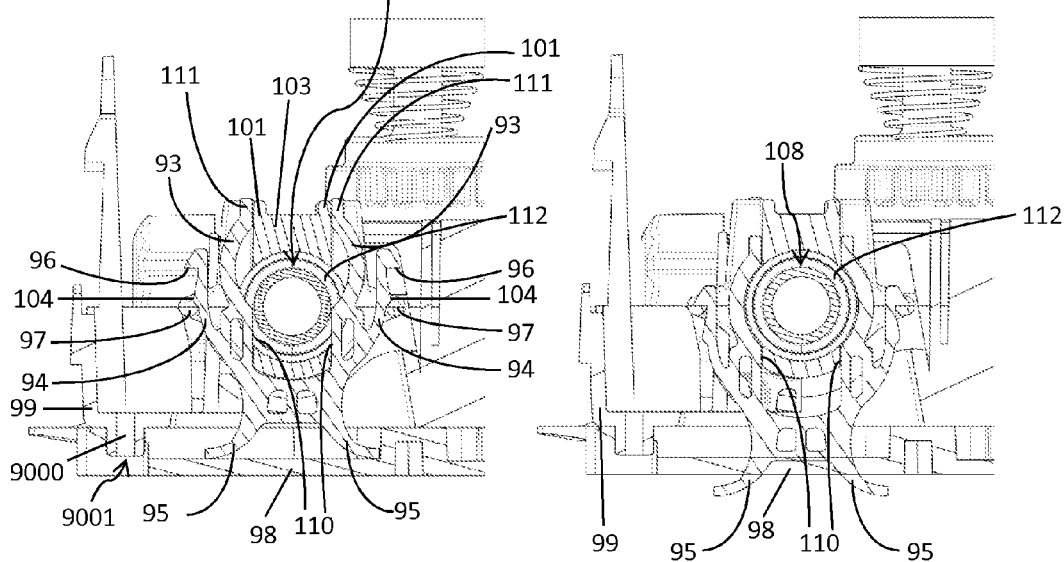
(a)  Fig. 3  (b)

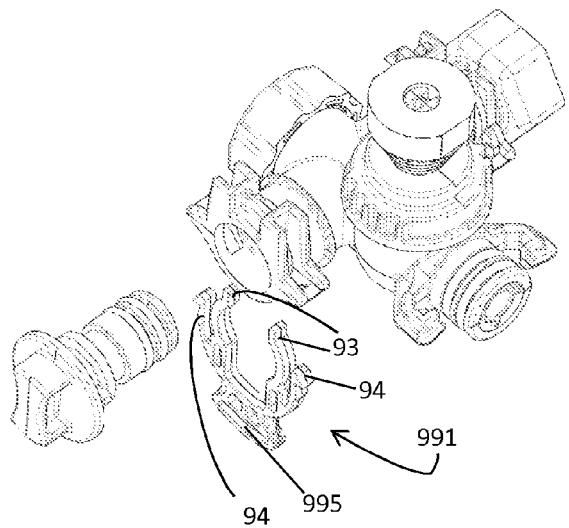
Fig. 5
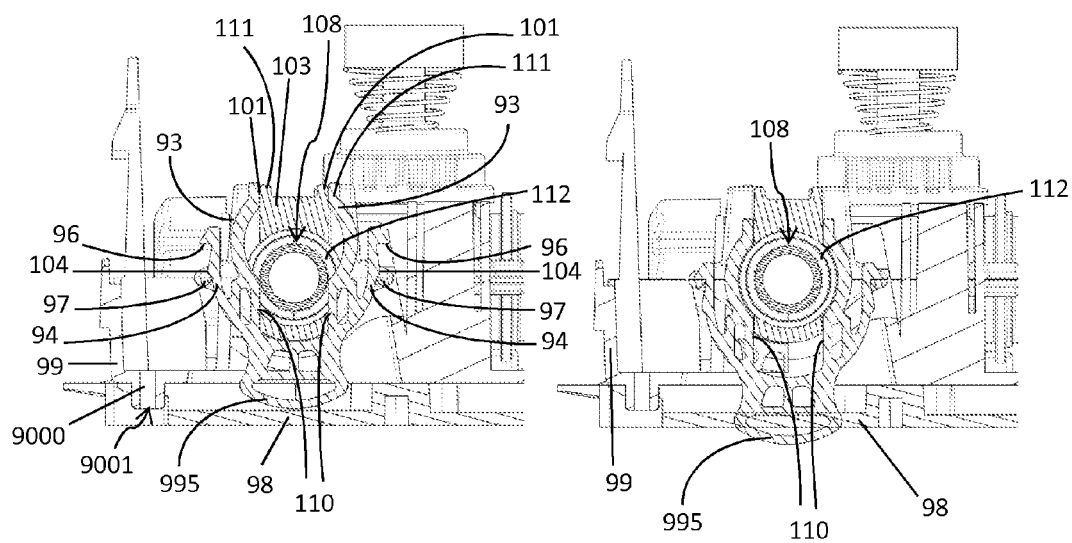
(a) Fig. 6 (b)

HYDRAULIC CROSS CONNECTION PROVIDED WITH SECURITY QUICK FASTENERS, RELATED KIT OF ACCESSORIES, AND RELATED HYDRAULIC SYSTEM

CROSS-REFERENCE TO THE RELATED APPLICATIONS

This application is a U.S. National phase of International Application PCT/IB2012/053703, filed on Jul. 19, 2012, which claims priority from Italian application RM2011A000388, filed on Jul. 20, 2011. The entire contents of the International and Italian applications are incorporated herein by reference.

The present invention relates to a hydraulic cross connection provided with security quick fasteners, for attaching stoppers and/or connectors, in particular for a mixing apparatus, capable to operate in a manner that is reliable, efficient, inexpensive, fast and safe for the operators. The present invention further relates to the related kit of accessories and to the related hydraulic system, as well as to a mixing apparatus comprising such hydraulic system.

In the following of this description, reference will be mainly made to an application of the hydraulic cross connection according to the invention to a mixing apparatus. However, it must be noted that the hydraulic cross connection according to the invention may be applied to any apparatus, device, equipment, system wherein it is necessary to connect a portion of hydraulic circuit to a supply, still remaining within the scope of protection of the present invention.

It is known that mixing apparatuses are widespread. In particular, in the field of cleaning and disinfection of surfaces, such apparatuses allow both treatment exclusively with water and adding of concentrated chemical products, such as for instance disinfectants, soaps, wet foams and dry foams. The apparatus described in document U.S. Pat. No. 7,017,621 B2 and the apparatus called KP1H available from the US company Knight are two examples of such mixing apparatuses.

With reference to FIG. 1, it may be observed that the hydraulic circuit of such apparatuses draws the water from the supply through a hydraulic cross connection 1, capable to operate with water pressure values up to 10 bars (i.e. $10^6$ Pascals), controlled by a magnetically actuated valve 2. The hydraulic cross connection 1, the housing case (not shown in FIG. 1) of which is mounted on the wall (directly or through a bracket) so that the magnetically actuated valve 2 is frontally accessible by an operator, comprises an inlet duct 70 upstream of the valve 2, for connecting to the supply through a connector 74, and an outlet duct 71 allowing the connection to a hydraulic cross connection of another mixing apparatus (or to any other duct) connected downstream of that shown in FIG. 1 through a similar connector (not shown in FIG. 1). In the case where the outlet duct 71 is not connected to any downstream hydraulic cross connection (or any other duct), it is closed through a stopper 72. The connector 74 and the stopper 72 are attached to the inlet duct 70 and outlet duct 71, respectively, through corresponding quick coupling removable hooks 73 frontally applied (i.e. from the same side of the magnetically actuated valve 2) by an operator.

The hydraulic cross connection 1, downstream of the magnetically actuated valve 2, comprises an elbow 10 (formed by an upstream duct 21 and a downstream duct 22) downstream of which an assembly 3 of separation valves is present, for preventing the backflow towards the chemical products supply, and, downstream of these, a mixing device 4 based on the Venturi effect, that mixes the water with the chemical product. In particular, the mixing device 4 comprises a small tube 5 wherein, upon the passage of water, a low pressure and hence an aspiration of the chemical product from an aspiration tube 6 (connected to an external tank through a mouth 82) and its dilution in water are generated. Dosage depends on the flow rate and water pressure, and it is possible to manage the dilution through proper nozzles 7 which are inserted into external tubes (not shown) for aspirating the chemical product and which adjust the percentage thereof. Such apparatuses are completely automatic and, since they are constituted only by a hydraulic system, they do not need any power supply.

The presence of the assembly 3 of separation valves is necessary because the chemical product tank are connected to the water supply of drinking water, and backflow prevention of the chemical products towards the supply must be hence guaranteed, e.g. in the case where a temporary low pressure occurs in the supply. In particular, the assembly 3 of separation valves generally comprises two cascaded valves: a flexible membrane separation valve 8, and a valve 9 with physical disconnection (wherein the flow of the liquid coming from the supply carries out a physical jump for entering the circuit comprising the mixing device 4).

However, the hydraulic cross connections of the prior art suffer from some drawbacks, due to the fact that the attachment of connectors 74 and stoppers 72 to the inlet and outlet ducts 70 and 71 may be not stable because of an incorrect installation of the removable hooks 73, creating situations of danger for the operators in the case where the connector 74 and/or the stopper 72 disengage under the pressure of the water coming from the supply (that, as stated, may arrive up to 10 bars—i.e. $10^6$ Pascals).

Some presently available solutions achieve a greater safety for the operators by eliminating, however, the possibility of a simple and fast attachment.

It is an object of this invention, therefore, to allow in a manner that is reliable, efficient, inexpensive, fast and safe for the operators to attach stoppers and/or connectors to a hydraulic cross connection.

It is specific subject-matter of the present invention a hydraulic system, in particular for a mixing apparatus, comprising:
- a hydraulic cross connection, housed in a housing case configured to be mounted on a rear planar support, the housing case comprising one or more supporting rear elements, each one having a free supporting end configured to rest on the rear planar support when the housing case is mounted on the same rear planar support, the hydraulic cross connection comprising one or more ducts,
- at least one tubular element having a longitudinal tube removably insertable in each one of said one or more ducts, the longitudinal tube externally comprising a circular notch, having a depth, delimited by ends of two portions of the longitudinal tube adjacent to the circular notch,
- at least one quick coupling removable hook, configured to be inserted in a seat obtained on an outer wall of each one of said one or more ducts, said at least one removable hook comprising at least one first front elastic arm and at least one second front elastic arm configured to interact with the seat and with the ends of the two portions of the longitudinal tube delimiting the circular notch of the longitudinal tube when inserted in one of said one or more ducts to which the seat belongs for locking the longitudinal tube, the hydraulic system being characterised in that said at least one quick coupling removable hook is configured to be posteriorly inserted in the seat and it comprises at least one rear arm, and in that a distance separating the seat of each one of said one or more ducts from a planar surface passing through each free supporting end of said one or more supporting rear elements of the housing case ranges from a minimum value equal to the minimum distance sufficient for housing said at least one rear arm when said at least one removable hook is inserted in the seat, including such minimum value, and a maximum value equal to the sum of the minimum distance sufficient for housing said at least one rear arm when said at least one removable hook is inserted in the seat with said depth of the notch of the longitudinal tube when inserted in one of said one or more ducts to which the seat belongs, excluding such maximum value, whereby said at least one removable hook is removable from the seat and the longitudinal tube is extractable from the duct to which the seat belongs only when the housing case is not mounted on the rear planar support.

Also according to the invention, said distance separating the seat of each one of said one or more ducts from the rear planar support may be equal to the minimum distance sufficient for housing said at least one rear arm when said at least one removable hook is inserted in the seat.

Still according to the invention, said at least one quick coupling removable hook comprises a first inner front elastic arm, a first outer front elastic arm, a second inner front elastic arm, and a second outer front elastic arm, the first and the second inner front arms being configured to interact with the ends of the two portions of the longitudinal tube delimiting the circular notch of the longitudinal tube when inserted in one of said one or more ducts to which the seat belongs for locking the longitudinal tube, the first inner front elastic arm and the first outer front elastic arm being preferably symmetric, respectively, to the second inner front elastic arm and to the second outer front elastic arm.

Furthermore according to the invention, said at least one quick coupling removable hook may comprise two rear arms, preferably symmetric to each other.

Also according to the invention, the seat of each one of said one or more ducts may comprise positioning mechanical means configured to interact with said at least one first front elastic arm and at least one second front elastic arm for positioning said at least one removable hook in the seat,
said positioning mechanical means preferably comprising two side slots formed by two shaped ribs projecting from the outer wall of the duct to which the seat belongs and by two respective side edges joining said two ribs, said at least one first front elastic arm and at least one second front elastic arm being configured to insert in the two side slots which keep a longitudinal position of said at least one removable hook with respect to an axis of the duct to which the seat belongs,
said positioning mechanical means more preferably comprising a frontally projecting element provided with two stopping side elements configured to interact with two corresponding ends of said at least one first front elastic arm and at least one second front elastic arm for angularly orientating said at least one removable hook with respect to the axis of the duct to which the seat belongs,
the two side edges being still more preferably configured interact with respective outer edges of said at least one first front elastic arm and at least one second front elastic arm, each one of which outer edges having a shaped profile ending with a projection, for radially positioning said at least one removable hook with respect to the axis of the duct to which the seat belongs,
the two side edges being even more preferably configured to interact as stops with respective teeth of said at least one first front elastic arm and at least one second front elastic arm for preventing said at least one removable hook from sliding in an unforced way outside the seat.

Still according to the invention, said one or more supporting rear elements may comprise a rear wall of the housing case, whereby a free rear surface of said rear wall operates as free supporting end.

Also according to the invention, said one or more supporting rear elements may comprise one or more projecting supporting elements, preferably one or more pins the free ends of which operate as free supporting end.

Still according to the invention, said at least one tubular element may be selected from the group comprising a connector and a closing stopper.

Furthermore according to the invention, said one or more ducts may comprise at least one inlet duct and at least one outlet duct.

It is still specific subject-matter of the present invention a hydraulic cross connection for use in the hydraulic system described above, the hydraulic cross connection comprising one or more ducts on an outer wall of each one of which a seat is obtained.

It is also specific subject-matter of the present invention a kit of hydraulic accessories for use in the hydraulic system described above, comprising:
  at least one tubular element, preferably selected from the group comprising a connector and a closing stopper, having a longitudinal tube externally comprising a circular notch, having a depth, delimited by ends of two portions of the longitudinal tube adjacent to the circular notch,
  at least one quick coupling removable hook comprising at least one first front elastic arm and at least one second front elastic arm.

It is further specific subject-matter of the present invention an apparatus for mixing a liquid, preferably water, drawn from a supply with one or more concentrated chemical products, comprising a hydraulic system comprising a hydraulic cross connection, at least one tubular element insertable in a duct of the hydraulic cross connection, and at least one quick coupling removable hook for locking said at least one tubular element when inserted in a duct of the hydraulic cross connection, characterised in that the hydraulic system is the hydraulic system described above.

The hydraulic cross connection provided with security quick fasteners according to the invention allows the housing case of the hydraulic cross connection to be mounted on a wall, directly or through a bracket, only if the stoppers and/or connectors connected to the inlet and outlet ducts of the hydraulic cross connection are correctly secured. In other words, the stoppers and/or the connectors may be released from the inlet and outlet ducts of the hydraulic cross connection according to the invention only when its housing case is not mounted on the wall, directly or through a bracket, and hence it is not connected to the water supply. This eliminates the risk of a sudden disengagement of stoppers and/or connectors under pressure, guaranteeing the safety for the operators.

The present invention will be now described, by way of illustration and not by way of limitation, according to its preferred embodiments, by particularly referring to the Figures of the annexed drawings, in which:

FIG. 1 schematically shows a perspective view (FIG. 1a) and a longitudinal cross-section view (FIG. 1b) of the hydraulic circuit of a mixing apparatus according to the prior art;

FIG. 2 schematically shows a perspective view of a preferred embodiment of the hydraulic cross connection according to the invention;

FIG. 3 schematically shows a longitudinal cross-section of a portion of the hydraulic cross connection of FIG. 2 in an attachment configuration (FIG. 3a) and in an open configuration (FIG. 3b);

FIG. 4 schematically shows a longitudinal cross-section of a portion of a second embodiment of the hydraulic cross connection according to the invention in an open configuration (FIG. 4a) and in an attachment configuration (FIG. 4b);

FIG. 5 schematically shows a perspective view of a further embodiment of the hydraulic cross connection according to the invention; and FIG. 6 schematically shows a longitudinal cross-section of a portion of the hydraulic cross connection of FIG. 5 in an attachment configuration (FIG. 6a) and in an open configuration (FIG. 6b).

In the Figures identical reference numerals will be used for alike elements.

With reference to FIG. 2, it may be observed that a preferred embodiment of the hydraulic cross connection 90 according to the invention comprising upstream of the valve 2 an inlet duct 70, for the connection to the water supply through a connector 105 (preferably upstream of which the connection with the supply comprises a tap for opening or closing the communication between inlet duct 70 and supply), and an outlet duct 71 closed through a stopper 106. It must be considered that the outlet duct 71 could be also connected to a hydraulic cross connection of another mixing apparatus (or to any other duct).

The connector 105 and the stopper 106 are attached to the inlet duct 70 and outlet duct 71, respectively, through corresponding quick coupling removable hooks 91 which are applied posteriorly, i.e. from the side of the hydraulic cross connection 90 facing the housing case (not shown in FIG. 2) that is mounted on the wall directly or through a bracket. The stopper 106 comprises a longitudinal tube 109, configured to be inserted into the outlet duct 71, that is provided with two sealing gaskets 107 and that has a circular notch 108 configured to interact with the hook 91, as it will be better illustrated later; similarly, the connector 105 comprises a longitudinal tube configured to be inserted into the inlet duct 70, that is provided with one or more sealing gaskets and that has a circular notch, similar to the notch 108 of the stopper 106, configured to interact with the respective hook 91.

Making reference also to FIG. 3, each one of the quick coupling removable hooks 91 is insertable into a seat 100 obtained on the outer wall of the outlet duct 71 (an identical seat is present on the outer wall of the inlet duct 70); each quick coupling removable hook 91 comprises two pairs symmetric to each other of front elastic arms, each one comprising an inner front elastic arm 93 and an outer front elastic arm 94, each pair being configured to insert into one of two corresponding side slots 92 of the seat 100.

A tooth 96 that is present on each one of the outer front elastic arms 94, by interacting as a stop with a side edge 97 of the respective side slot 92 of the seat 100, is configured to prevent the hook 91 from sliding in an unforced way outside the seat (i.e. unless an operator press the outer front elastic arms 94 towards the inner front elastic arms 93), whereas a frontally projecting element 103 of the seat 100 is provided with two stopping side elements 101 interacting with the ends 111 of the two inner front elastic arms 93 for maintaining the correct angular orientation of the hook 91 with respect to the axis of the outlet duct 71; moreover, the seat 100 further comprises two pairs of shaped ribs 102 projecting from the outer wall of the duct 71, which contribute (along with the side edge 97 joining them) to form the side slots 92, and which maintains the longitudinal position of the hook 91. A shaped profile of the external edge of each one of the outer front elastic arms 94, ending with a projection 104, advantageously interacts with the side edge 97 of the respective side slot 92 of the seat 100 for favouring the correct radial positioning of the hook 91, i.e. its positioning at the correct distance from the longitudinal axis of the outlet duct 71.

FIG. 3 shows a portion of the housing case 99 housing the hydraulic cross connection 90; in particular, the housing case 99 is configured to be mounted, preferably in a removable way, on a rear planar support 98 (that may comprise or consist of a bracket or a mounting wall). The removable hook 91 further comprises two rear arms 95, symmetric to each other, interacting as stops with the bracket 98, mounted on a wall, on which the housing case 99 of the hydraulic cross connection 90 is mounted; in particular, the reference numeral 98 of FIG. 3 could also indicate the wall on which the case 99 can be directly mounted. In this regard, the housing case 99 comprises one or more supporting rear elements, each one having a supporting free end configured to rest on the rear planar support 98 when the housing case 99 is mounted on the same rear planar support 98 (that may comprise or consist of a bracket or a mounting wall). By way of example and not by way of limitation, the housing case 99 may comprise as supporting rear element a rear wall of the same case, which rear wall is configured to be attached, preferably in a removable way, to a supporting planar wall, e.g. by means of screws removably insertable, thanks to through holes of such rear wall, into corresponding block inserted into the supporting planar wall, or by means of bolts removably anchored, thanks to through holes of such rear wall, to a supporting planar bracket or through clamps removably securable to a supporting planar bracket; in this case, the free surface operates as supporting free end of the rear wall, in turn operating as supporting rear element, of the housing case 99. Still by way of example and not by way of limitation, the housing case 99 may comprise, as supporting rear elements, supporting projecting elements, as for instance pins 9000, the free ends 9001 of which operate as supporting free ends; in this case, the housing case 99 may be mounted, preferably in a removable way, on a supporting planar wall or a supporting planar bracket through securing means as screws, bolts, and clamps.

As shown in FIG. 3a, when the removable hook 91 is correctly closed, it is secured in the seat 100 so that the two pairs of front elastic arms, 93 and 94, are inserted into the respective two slots 92, the two inner front elastic arms 93 interact as stops with the two side elements 101 of the frontally projecting element 103, and the two rear arms 95 interact as stops with the mounting bracket (or the wall) 98, since the housing case 99 of the hydraulic cross connection is shaped such that, when mounted on the mounting bracket (or on the wall) 98, the distance separating the seat 100 from the mounting bracket (or from the wall) 98 is the minimum distance that is sufficient for housing (the rear portion of the hook 91 and) the two rear arms 95 of the hook 91. Such distance is equal to the distance separating the seat 100 from the supporting free ends of said one or more supporting rear elements of the housing case 99 (i.e., in FIG. 3, to the distance separating the seat 100 from the free ends 9001 of the supporting pins 9000). In such attachment configuration, an internal edge 110 of each one of the two inner front elastic arms 93 inserts into the notch 108 of the stopper 106 and it interacts as a stop with the ends of the adjacent portions of the tube 109 delimiting the notch 108 (only the end 112 of the proximal portion is visible in FIG. 3), keeping the stopper 106 locked.

In particular, in the present description and claims it must be understood that the distance separating the seat 100 from the supporting free ends of said one or more supporting rear elements of the housing case 99 (i.e. the distance separating the seat 100 from the mounting bracket 98 or from the wall) is equal to the length of the minimum straight line separating the base of the notch 108 from the planar surface passing through the supporting free ends of said one or more supporting rear elements of the housing case 99 (i.e. the minimum straight line separating the base of the notch 108 from the bracket or from the wall 98).

In order that the stopper 106 can be released from the outlet duct 71, it is necessary that the removable hook 91 moves posteriorly to the hydraulic cross connection 90, as shown in FIG. 3*b*, until the internal edge 110 of each one of the two inner front elastic arms 93 exits from the notch 108 of the stopper 106 allowing the latter to move longitudinally. However, in order that this is possible, it is further necessary that there is the space required by the posterior movement of the two rear arms 95, and such condition only occurs when the housing case 99 of the hydraulic cross connection 90 is not mounted on the mounting bracket (or on the wall) 98, i.e. in a condition wherein the hydraulic cross connection is disconnected from the supply. In other words, the stopper 106 may exit from the outlet duct 71 only if the housing case 99 of the hydraulic cross connection 90 is not mounted on the mounting bracket (or on the wall) 98, since otherwise the mounting bracket (or the wall) 98 prevents the hook 91 from opening.

With reference to FIG. 4, it may be observed that a second embodiment of the hydraulic cross connection according to the invention differs from that illustrated with reference to FIGS. 2 and 3 by the fact that the housing case 99 of the hydraulic cross connection 90 is shaped so that, when mounted on the wall (or on the mounting bracket) 98, the distance separating the seat 100 from the supporting free ends of said one or more supporting rear elements of the housing case 99 (i.e. the distance separating the seat 100 from the free ends 9001 of the supporting pins 9000, that is equal to the distance separating the seat 100 from the mounting bracket—or from the wall—98) is longer than the minimum distance that is sufficient for housing the two rear arms 95 of the hook 91; in particular, such distance is equal to the sum of the minimum distance sufficient for housing the two rear arms 95 of the hook 91 with a second distance shorter than the depth of the notch 108 of the stopper 106. In such case, when the housing case 99 of the hydraulic cross connection 90 is mounted on the wall (or on the mounting bracket) 98, the hook 91 cannot in any case move posteriorly to the hydraulic cross connection 90 by a distance that is sufficient to the internal edge 110 of each one of the two inner front elastic arms 93 for exiting from the notch 108 of the stopper 106, thus preventing the latter from moving longitudinally.

In general, the housing case 99 of the hydraulic cross connection 90 is shaped so that the distance separating the seat 100 from a planar surface passing through each supporting free end of said one or more supporting rear elements of the housing case 99 (e.g. the distance separating the seat 100 from a planar surface passing through the free ends 9001 of the supporting pins 9000 in FIGS. 3 and 4), that is equal to the distance separating the seat 100 from the wall (or from the mounting bracket) 98 (when the housing case 99 is mounted on the mounting bracket—or on the wall—98), ranges from a minimum value equal to the minimum distance that is sufficient for housing the two rear arms 95 of the hook 91, including such minimum value, and a maximum value equal to the sum of the minimum distance that is sufficient for housing the two rear arms 95 of the hook 91 with the depth of the notch 108 of the stopper 106, excluding such maximum value.

What described above with reference to the stopper 106 is also valid with reference to the connector 105.

Other embodiments of the hydraulic cross connection according to the invention may have the hook comprising, instead of two pairs symmetric to each other of front elastic arms, two front elastic arms symmetric to each other, each one of which may be shaped so as to comprise the tooth 96 and/or the ends 111 and/or an external edge having a shaped profile ending with the projection 104 and/or the internal edge 110.

Further embodiments of the hydraulic cross connection according to the invention may have the hook comprising, instead of two rear arms 95, a single rear arm. By way of example, FIG. 5 shows an embodiment of the hydraulic cross connection according to the invention differing from the one shown in FIG. 3 by the fact that the hook 991 comprises a single arc-shaped rear arm 995 that projects posteriorly from the hook 991 (whereas the other elements of the hook 991 are the same ones of the hook 91 of FIGS. 2-4). As schematically shown in FIG. 6 for the attachment configuration (FIG. 6*a*) and for the open configuration (FIG. 6*b*), the operation of the hook 991 is similar to that of the hook 91 schematically shown in FIG. 3.

Also, other embodiments of the hydraulic cross connection according to the invention may have mechanical means for positioning the hook different from the two side slots 92 comprising the side edge 97 of the seat 100, and/or from the frontally projecting element 103 of the seat 100 provided with two stopping side elements 101, and/or from the ends of the portions of the tube 109 delimiting the notch 108.

The preferred embodiments of this invention have been described and a number of variations have been suggested hereinbefore, but it should be understood that those skilled in the art can make other variations and changes, without so departing from the scope of protection thereof, as defined by the enclosed claims.

The invention claimed is:

1. A hydraulic system comprising:
   a hydraulic cross connection, housed in a housing case configured to be mounted on a rear planar support, the housing case comprising one or more supporting rear elements, each one having a free supporting end configured to rest on the rear planar support when the housing case is mounted on the same rear planar support, the hydraulic cross connection comprising one or more ducts,
   at least one tubular element having a longitudinal tube removably insertable in each one of said one or more ducts, the longitudinal tube externally comprising a circular notch, having a depth, delimited by ends of two portions of the longitudinal tube adjacent to the circular notch,
   at least one quick coupling removable hook, configured to be inserted in a seat obtained on an outer wall of each one of said one or more ducts, said at least one removable hook comprising at least one first front elastic arm and at least one second front elastic arm configured to interact with the seat and with the ends of the two portions of the longitudinal tube delimiting the circular notch of the longitudinal tube when inserted in one of said one or more ducts to which the seat belongs for locking the longitudinal tube,
   wherein said at least one quick coupling removable hook is configured to be posteriorly inserted in the seat and it comprises at least one rear arm, and wherein a distance separating the seat of each one of said one or more ducts from a planar surface passing through each free supporting end of said one or more supporting rear elements of the housing case ranges from a minimum value equal to the minimum distance sufficient for housing said at least one rear arm when said at least one removable hook is inserted in the seat, including such minimum value, and a maximum value equal to the sum of the minimum distance sufficient for housing said at least one rear arm when said at least one removable hook is inserted in the seat with said depth of the notch of the longitudinal tube when inserted in one of said one or more ducts to which the seat belongs, excluding such maximum value, whereby said at least one removable hook is removable from the seat and the longitudinal tube is extractable from the duct to which the seat belongs only when the housing case is not mounted on the rear planar support.

2. The hydraulic system according to claim 1, wherein said distance separating the seat of each one of said one or more ducts from the rear planar support is equal to the minimum distance sufficient for housing said at least one rear arm when said at least one removable hook is inserted in the seat.

3. The hydraulic system according to claim 1, wherein said at least one quick coupling removable hook comprises a first inner front elastic arm, a first outer front elastic arm, a second inner front elastic arm, and a second outer front elastic arm, the first and the second inner front arms being configured to interact with the ends of the two portions of the longitudinal tube delimiting the circular notch of the longitudinal tube when inserted in one of said one or more ducts to which the seat belongs for locking the longitudinal tube.

4. The hydraulic system according to claim 3, wherein the first inner front elastic arm and the first outer front elastic arm are symmetric, respectively, to the second inner front elastic arm and to the second outer front elastic arm.

5. The hydraulic system according to claim 1, wherein said at least one quick coupling removable hook comprises two rear arms.

6. The hydraulic system according to claim 5, wherein said two rear arms are symmetric to each other.

7. The hydraulic system according to claim 1, wherein the seat of each one of said one or more ducts comprises positioning mechanical means configured to interact with said at least one first front elastic arm and at least one second front elastic arm for positioning said at least one removable hook in the seat.

8. The hydraulic system according to claim 7, wherein said positioning mechanical means comprises two side slots formed by two shaped ribs projecting from the outer wall of the duct to which the seat belongs and by two respective side edges joining said two ribs, said at least one first front elastic arm and at least one second front elastic arm being configured to insert in the two side slots which keep a longitudinal position of said at least one removable hook with respect to an axis of the duct to which the seat belongs.

9. The hydraulic system according to claim 8, wherein said positioning mechanical means comprises a frontally projecting element provided with two stopping side elements configured to interact with two corresponding ends of said at least one first front elastic arm and at least one second front elastic arm for angularly orientating said at least one removable hook with respect to the axis of the duct to which the seat belongs.

10. The hydraulic system according to claim 9, wherein the two side edges are configured to interact with respective outer edges of said at least one first front elastic arm and at least one second front elastic arm, each one of which outer edges having a shaped profile ending with a projection, for radially positioning said at least one removable hook with respect to the axis of the duct to which the seat belongs.

11. The hydraulic system according to claim 10, wherein the two side edges are configured to interact as stops with respective teeth of said at least one first front elastic arm and at least one second front elastic arm for preventing said at least one removable hook from sliding in an unforced way outside the seat.

12. The hydraulic system according to claim 1, wherein said one or more supporting rear elements comprise a rear wall of the housing case, whereby a free rear surface of said rear wall operates as free supporting end.

13. The hydraulic system according to claim 1, wherein said one or more supporting rear elements comprise one or more projecting supporting elements.

14. The hydraulic system according to claim 13, wherein said one or more projecting supporting elements are one or more pins the free ends of which operate as free supporting end.

15. The hydraulic system according to claim 1, wherein said at least one tubular element is selected from the group comprising a connector and a closing stopper.

16. The hydraulic system according to claim 1, wherein said one or more ducts comprise at least one inlet duct and at least one outlet duct.

17. An apparatus for mixing a liquid drawn from a supply with one or more concentrated chemical products, comprising a hydraulic system comprising a hydraulic cross connection, at least one tubular element insertable in a duct of the hydraulic cross connection, and at least one quick coupling removable hook for locking said at least one tubular element when inserted in a duct of the hydraulic cross connection, wherein the hydraulic system comprises:

a hydraulic cross connection, housed in a housing case configured to be mounted on a rear planar support, the housing case comprising one or more supporting rear elements, each one having a free supporting end configured to rest on the rear planar support when the housing case is mounted on the same rear planar support, the hydraulic cross connection comprising one or more ducts, at least one tubular element having a longitudinal tube removably insertable in each one of said one or more ducts, the longitudinal tube externally comprising a circular notch, having a depth, delimited by ends of two portions of the longitudinal tube adjacent to the circular notch, at least one quick coupling removable hook, configured to be inserted in a seat obtained on an outer wall of each one of said one or more ducts, said at least one removable hook comprising at least one first front elastic arm and at least one second front elastic arm configured to interact with the seat and with the ends of the two portions of the longitudinal tube delimiting the circular notch of the longitudinal tube when inserted in one of said one or more ducts to which the seat belongs for locking the longitudinal tube, wherein said at least one quick coupling removable hook is configured to be posteriorly inserted in the seat and it comprises at least one rear arm, and wherein a distance separating the seat of each one of said one or more ducts from a planar surface passing through each free supporting end of said one or more supporting rear elements of the housing case ranges from a minimum value equal to the minimum distance sufficient for housing said at least one rear arm when said at least one removable hook is inserted in the seat, including such minimum value, and a maximum value equal to the sum of the minimum distance sufficient for housing said at least one rear arm when said at least one removable hook is inserted in the seat with said depth of the notch of the longitudinal tube when inserted in one of said one or more ducts to which the seat belongs, excluding such maximum value, whereby said at least one removable hook is removable from the seat and the longitudinal tube is extractable from the duct to which the seat belongs only when the housing case is not mounted on the rear planar support.

* * * * *